US009500829B2

(12) United States Patent
Rudenick et al.

(10) Patent No.: US 9,500,829 B2
(45) Date of Patent: Nov. 22, 2016

(54) SYSTEMS AND METHODS FOR THE MANAGEMENT OF FIBER OPTIC CABLES

(71) Applicant: ADC Telecommunications, Inc., Berwyn, PA (US)

(72) Inventors: Paula Rudenick, Jordan, MN (US); Dennis Krampotich, Shakopee, MN (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 14/341,971

(22) Filed: Jul. 28, 2014

(65) Prior Publication Data

US 2014/0334793 A1    Nov. 13, 2014

Related U.S. Application Data

(63) Continuation of application No. 13/607,248, filed on Sep. 7, 2012, now Pat. No. 8,805,153.

(60) Provisional application No. 61/535,660, filed on Sep. 16, 2011.

(51) Int. Cl.
  *G02B 6/00* (2006.01)
  *G02B 6/44* (2006.01)
  (Continued)

(52) U.S. Cl.
  CPC ............... *G02B 6/4439* (2013.01); *F16L 3/00* (2013.01); *F16L 3/18* (2013.01); *F16L 3/26* (2013.01); *G02B 6/4471* (2013.01); *Y10T 29/4913* (2015.01)

(58) Field of Classification Search
  CPC  G02B 6/4452; G02B 6/3897; G02B 6/4459; G02B 6/4454; G02B 6/4471; G02B 6/3652; G02B 6/3887

USPC .............. 385/134–137; 248/60, 63, 68.1, 69, 248/74.3

See application file for complete search history.

(56) References Cited

U.S. PATENT DOCUMENTS 1,790,056 A  *  1/1931  Moody .................. E21B 19/04
                                                    24/599.5
2,318,853 A      3/1941  Hall
(Continued)

FOREIGN PATENT DOCUMENTS

| DE | 10 2007 009 223 A1 | 8/2008 |
| JP | 2010-88255 | 4/2010 |
| KR | 20-0445726 Y1 | 8/2009 |

OTHER PUBLICATIONS

International Search Report and Written Opinion for PCT/US2012/054148 mailed Feb. 27, 2013.
(Continued)

*Primary Examiner* — Ellen Kim
(74) *Attorney, Agent, or Firm* — Merchant & Gould P.C.

(57) ABSTRACT

The present disclosure relates to a fiber optic retention device to properly accommodate for cable management arrangements and schemes in telecommunication infrastructures that are massive in scale and/or require subsequent adaptation of the infrastructures. The device includes a C-shaped opening and a spring biased door which moves inwardly to allow cable entry and exit to the device. In one embodiment, the spring is an integral extension of the door. In another embodiment, the spring is a separate torsion coil spring.

17 Claims, 13 Drawing Sheets

(51) Int. Cl.
*F16L 3/00* (2006.01)
*F16L 3/18* (2006.01)
*F16L 3/26* (2006.01)

(56) References Cited

U.S. PATENT DOCUMENTS

| | | | |
|---|---|---|---|
| 3,061,253 A | 1/1960 | Keaton | |
| 3,802,654 A | 4/1974 | Jenko et al. | |
| 4,119,285 A | 10/1978 | Bisping et al. | |
| 4,470,179 A | 9/1984 | Gollin et al. | |
| 4,561,153 A | 12/1985 | Matsui | |
| 4,805,479 A | 2/1989 | Brightwell | |
| 4,917,340 A | 4/1990 | Juemann et al. | |
| 5,005,266 A * | 4/1991 | Fister | F16B 45/02 24/599.8 |
| 5,210,914 A | 5/1993 | Katsma | |
| 5,416,955 A * | 5/1995 | Katsma | F16B 45/02 24/588.1 |
| 5,474,572 A * | 12/1995 | Hayhurst | 606/232 |
| 5,529,268 A | 6/1996 | Wright | |
| 5,725,185 A | 3/1998 | Auclair | |
| 5,742,982 A | 4/1998 | Dodd et al. | |
| 5,887,487 A | 3/1999 | Bravo | |
| 5,961,081 A | 10/1999 | Rinderer | |
| 5,988,570 A | 11/1999 | Gretz | |
| 6,173,104 B1 | 1/2001 | Polidori | |
| 6,215,069 B1 | 4/2001 | Martin et al. | |
| 6,220,554 B1 | 4/2001 | Daoud | |
| 6,332,594 B2 | 12/2001 | Shelton et al. | |
| 6,381,393 B1 * | 4/2002 | Matthews et al. | 385/134 |
| 6,443,402 B1 | 9/2002 | Ferrill et al. | |
| 6,466,727 B1 | 10/2002 | Leeb | |
| 6,517,032 B1 | 2/2003 | Gretz | |
| 6,539,161 B2 | 3/2003 | Holman et al. | |
| 6,594,436 B2 | 7/2003 | Sun et al. | |
| 6,613,981 B1 * | 9/2003 | Hathcock et al. | 174/69 |
| 6,614,981 B2 * | 9/2003 | Zdinak et al. | 385/136 |
| 6,621,714 B1 * | 9/2003 | Li et al. | 361/801 |
| 6,658,193 B1 * | 12/2003 | Ati et al. | 385/136 |
| 6,665,484 B2 | 12/2003 | Douglas et al. | |
| 6,677,520 B1 | 1/2004 | Kim et al. | |
| 6,728,461 B1 * | 4/2004 | Senatore et al. | 385/135 |
| 6,768,858 B2 | 7/2004 | Tinucci et al. | |
| 6,771,871 B2 | 8/2004 | Krampotich et al. | |
| 6,850,687 B2 | 2/2005 | Lavoie | |
| 6,892,020 B2 * | 5/2005 | Douglas et al. | 385/136 |
| 6,944,383 B1 | 9/2005 | Herzog et al. | |
| 6,947,654 B2 | 9/2005 | Krampotich et al. | |
| 7,077,363 B2 | 7/2006 | Rivera | |
| 7,079,744 B2 | 7/2006 | Douglas et al. | |
| 7,097,473 B2 | 8/2006 | Krampotich et al. | |
| 7,107,653 B2 | 9/2006 | Thompson | |
| 7,150,439 B2 | 12/2006 | Konold | |
| 7,201,352 B2 | 4/2007 | Kawai | |
| 7,210,658 B2 | 5/2007 | Carrera | |
| 7,228,048 B1 | 6/2007 | Dunfee et al. | |
| 7,267,307 B2 | 9/2007 | Bauer | |
| 7,346,252 B2 | 3/2008 | Krampotich et al. | |
| 7,373,071 B2 | 5/2008 | Douglas et al. | |
| 7,397,996 B2 | 7/2008 | Herzog et al. | |
| 7,527,226 B2 | 5/2009 | Kusuda et al. | |
| 7,837,156 B1 | 11/2010 | Handler | |
| 7,909,624 B2 | 3/2011 | Iida | |
| 7,933,484 B2 | 4/2011 | Hetzer et al. | |
| 7,992,267 B2 * | 8/2011 | Christianson | F16B 45/02 24/598.2 |
| 8,074,945 B2 | 12/2011 | Schoenau et al. | |
| 8,275,230 B2 | 9/2012 | Womack | |
| 8,330,043 B2 * | 12/2012 | Alaniz et al. | 174/100 |
| 8,485,479 B2 | 7/2013 | Chiu et al. | |
| 8,805,153 B2 | 8/2014 | Rudenick et al. | |
| 8,882,051 B2 | 11/2014 | Bleus et al. | |
| 8,985,658 B2 * | 3/2015 | Chepurny | F16B 45/025 24/599.1 |
| 2002/0131751 A1 | 9/2002 | Zdinak et al. | |
| 2002/0181921 A1 | 12/2002 | Daoud et al. | |
| 2005/0152536 A1 | 7/2005 | Caveney | |
| 2006/0204198 A1 | 9/2006 | Michiels | |
| 2007/0017266 A1 | 1/2007 | Huang | |
| 2008/0093510 A1 | 4/2008 | Oh et al. | |
| 2008/0185183 A1 | 8/2008 | Chen | |
| 2008/0239681 A1 | 10/2008 | Iida | |
| 2009/0266945 A1 | 10/2009 | Dietrich et al. | |
| 2010/0012792 A1 | 1/2010 | Gollin et al. | |
| 2010/0209068 A1 | 8/2010 | Womack | |
| 2010/0272410 A1 | 10/2010 | Krampotich et al. | |
| 2011/0100772 A1 | 5/2011 | Narayanan V. et al. | |
| 2012/0097804 A1 | 4/2012 | Liu | |
| 2013/0140410 A1 | 6/2013 | Lee et al. | |
| 2013/0148937 A1 | 6/2013 | Rudenick et al. | |

OTHER PUBLICATIONS

International Search Report and Written Opinion for application No. PCT/US2010/031897 mailed Jun. 6, 2011.

* cited by examiner

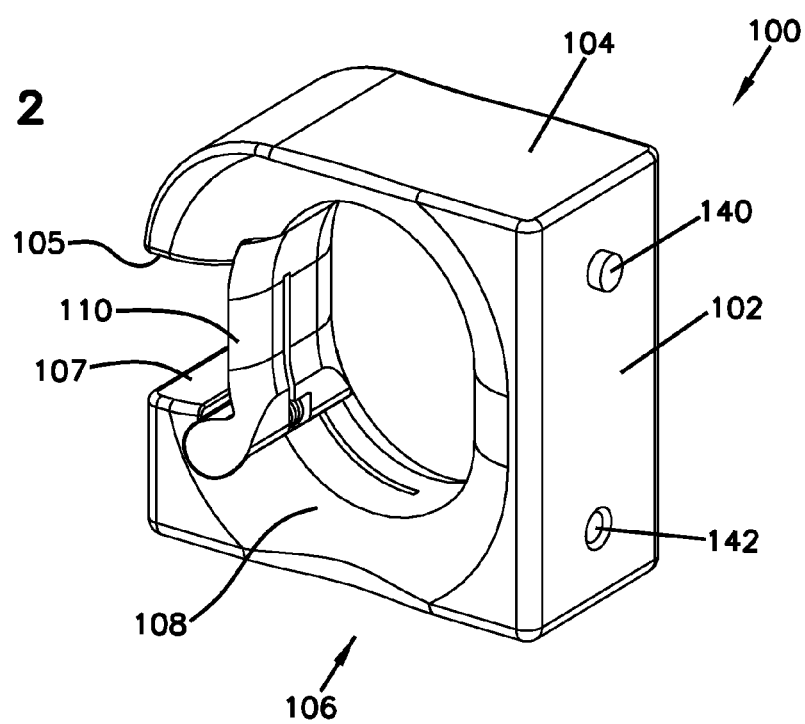
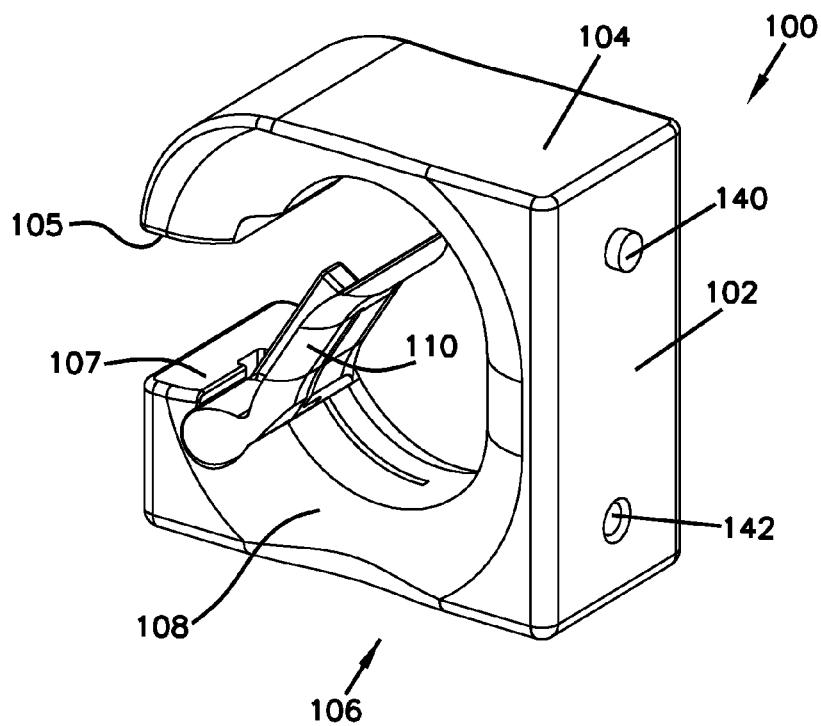

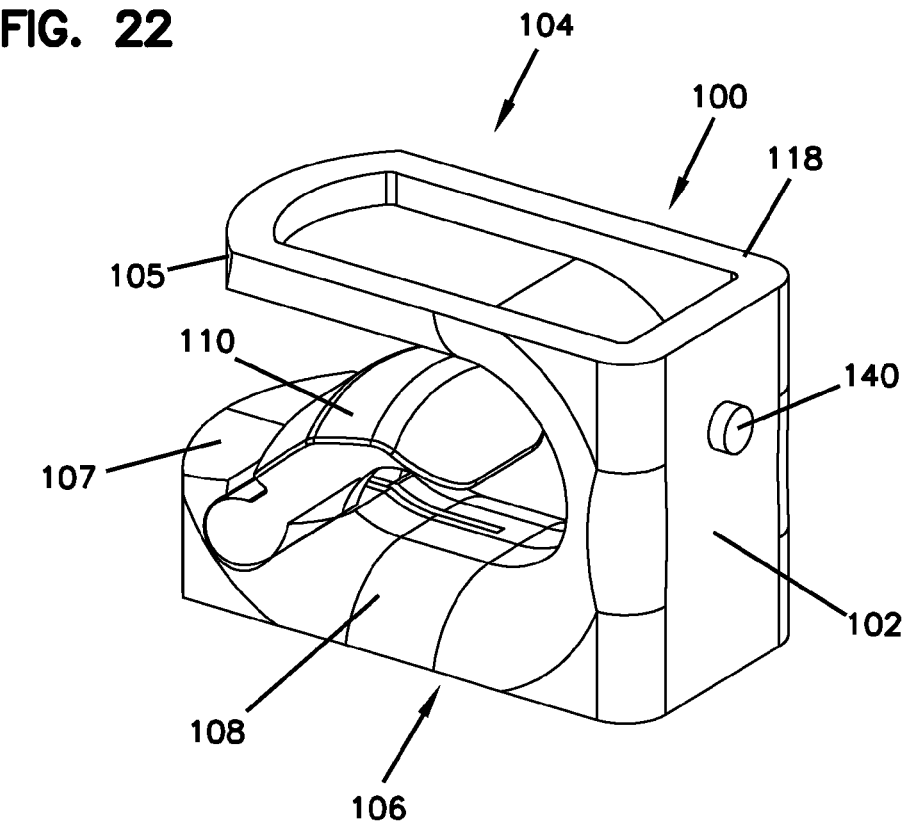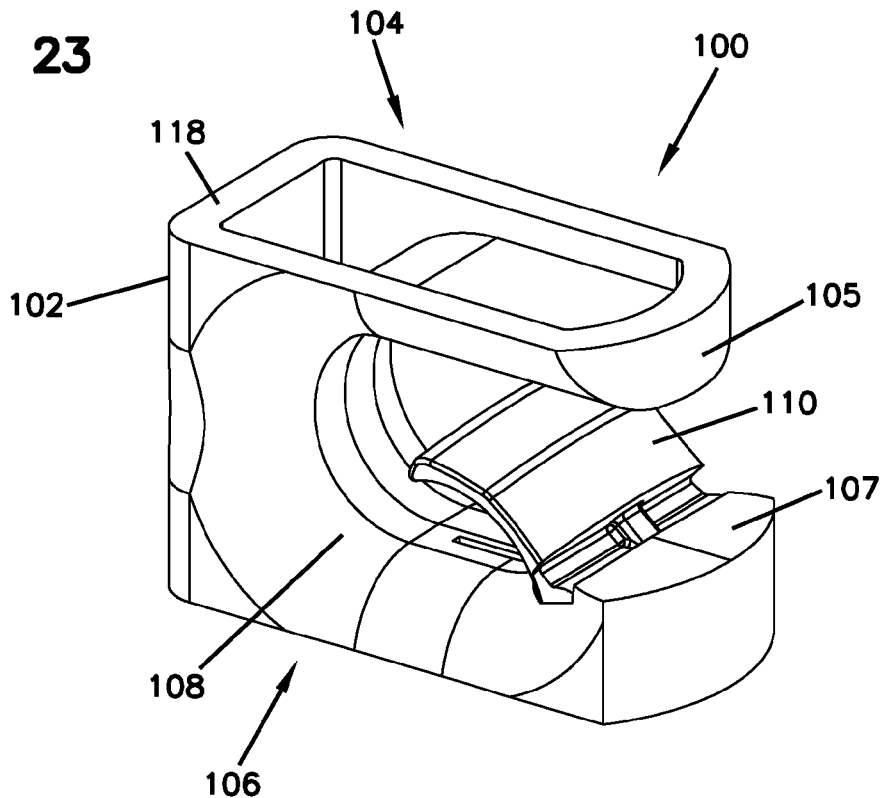

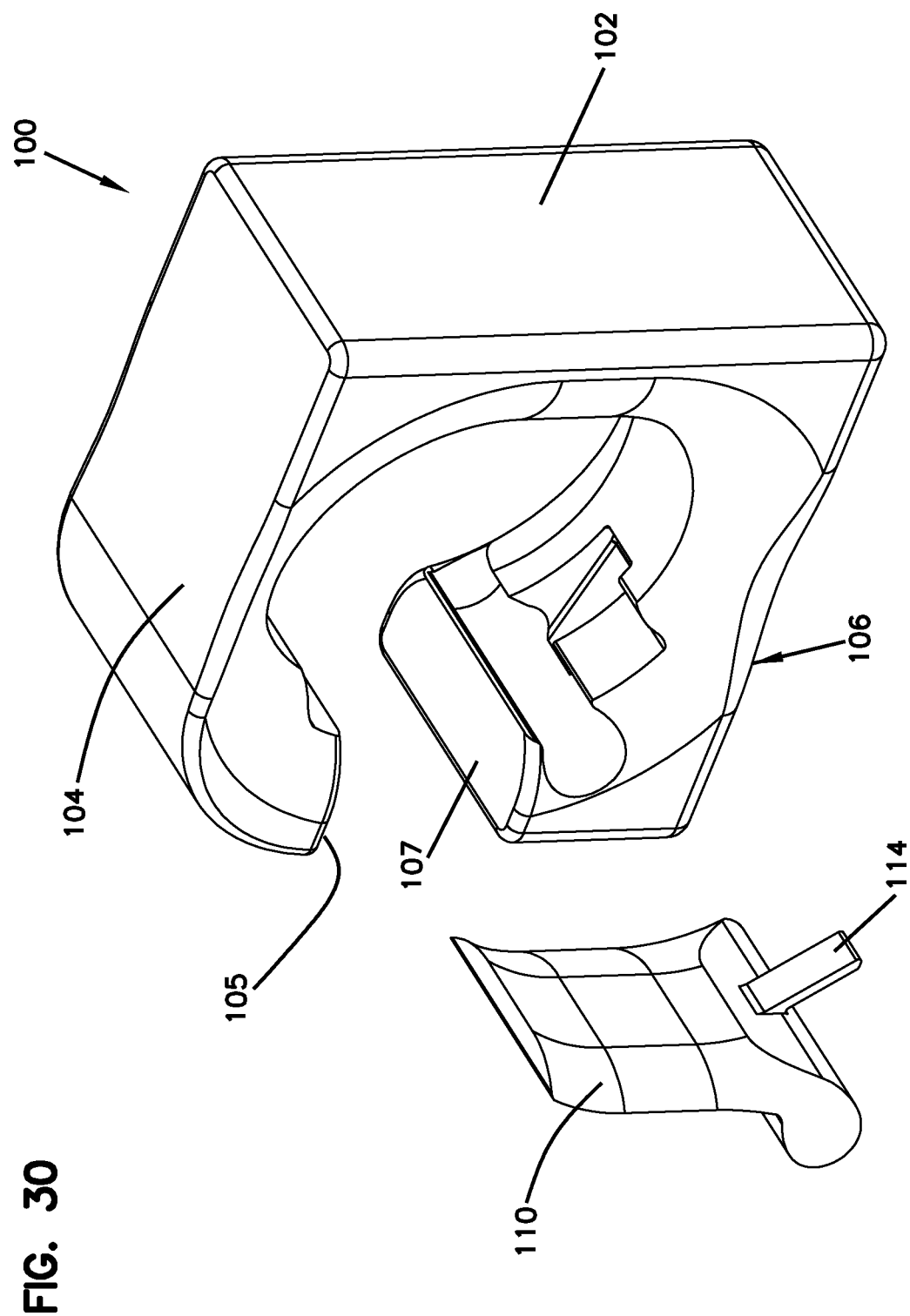

SYSTEMS AND METHODS FOR THE MANAGEMENT OF FIBER OPTIC CABLES

CROSS REFERENCE TO RELATED APPLICATIONS

This application is a continuation of application Ser. No. 13/607,248, filed Sep. 7, 2012, now issued as U.S. Pat. No. 8,805,153, which application claims the benefit of provisional application Ser. No. 61/535,660, filed Sep. 16, 2011, which applications are hereby incorporated by reference in their entirety.

TECHNICAL FIELD

The present disclosure relates to the management of fiber optic cables and more specifically to a cable retention device.

BACKGROUND

Fiber optic communication systems are becoming prevalent in part because service providers want to deliver high bandwidth communication capabilities (e.g., data and voice) to customers. Fiber optic communication systems employ a network of fiber optic cables to transmit large volumes of data and voice signals over relatively long distances.

Cable management arrangements for cable termination, splice, and storage come in many forms. These cable management arrangements are designed to provide organized, high density, cable termination, splice, and storage in telecommunication infrastructures that often have limited space.

Because telecommunication infrastructures are massive in scale, the original installation and subsequent adaptation of the infrastructures can be difficult to manage. Accordingly, the ability to adapt cable management arrangements and schemes is important. There is a continued need in the art for better cable management devices and arrangements.

SUMMARY

One aspect of the present disclosure relates to a fiber optic cable retention device to properly accommodate for cable management arrangements and schemes in telecommunication infrastructures that are massive in scale, have limited space, and/or require subsequent adaptation of the infrastructures.

Another aspect of the present disclosure relates to a fiber optic retention device that includes a C-shaped body, a moveable door, and a spring. The C-shaped body includes a first end, a second end, an exterior flat base, and a rounded interior. The first end and the second end of the C-shaped body form an opening to the rounded interior of the C-shaped body. The exterior flat base includes at least a first flat side and a second flat side. The rounded interior extends from the exterior flat base. The moveable door is nested in the C-shaped body. The moveable door is sized to extend at least substantially from the first end of the C-shaped body to the second end of the C-shaped body to at least substantially close off the opening. The spring is nested in the C-shaped body and operatively connected to the moveable door. The spring biases the moveable door into a closed position. The rounded interior has a curvature larger than the minimum bend radius of any fiber optic cables stored within the fiber optic cable retention device.

A further aspect of the present disclosure relates to a fiber optic retention device that includes a C-shaped body and a moveable door. The C-shaped body includes a first end, a second end, an exterior flat base, and a rounded interior. The first end and the second end of the C-shaped body form an opening to the rounded interior of the C-shaped body. The exterior flat base includes at least a first flat side and a second flat side. The rounded interior extends from the exterior flat base. The moveable door includes a biasing member. At least the biasing member of the moveable door is nested in the C-shaped body. The moveable door is sized to extend at least substantially from the first end of the C-shaped body to the second end of the C-shaped body to at least substantially close off the opening. The biasing member biases the moveable door into a closed position. The rounded interior has a curvature larger than the minimum bend radius of any fiber optic cables stored within the fiber optic cable retention device.

An additional aspect of the present disclosure relates to a fiber optic retention device that includes a C-shaped body, a moveable door, and a spring. The C-shaped body includes a first end, a second end, an exterior flat base, a first side, a second side, and a rounded interior. The first end and the second end of the C-shaped body form an opening to the rounded interior of the C-shaped body. The first and the second sides include a flat portion. The rounded interior extends from at least the exterior flat base, the first side, and the second side. The moveable door is nested in the C-shaped body. The moveable door is sized to extend at least substantially from the first end of the C-shaped body to the second end of the C-shaped body to at least substantially close off the opening. The spring is nested in the C-shaped body and operatively connected to the moveable door. The spring biases the moveable door into a closed position. The rounded interior has a curvature larger than the minimum bend radius of any fiber optic cables stored within the fiber optic cable retention device.

In one embodiment, the spring is an integral extension of the door. In another embodiment, the spring is a separate torsion coil spring.

A variety of additional aspects will be set forth in the description that follows. These aspects relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

FIG. 2 is an isometric, second side view of an embodiment of a fiber optic cable retention device with a door in a closed position in accordance with the principles of the present disclosure;

FIG. 3 is an isometric, second side view of an embodiment of a fiber optic cable retention device with a door in an open position in accordance with the principles of the present disclosure;

FIG. 22 is an isometric, second side view of an embodiment of a fiber optic cable retention device in accordance with the principles of the present disclosure;

FIG. 23 is an isometric, first side view of an embodiment of a fiber optic cable retention device in accordance with the principles of the present disclosure;

FIG. 30 is an isometric, second side view of an embodiment of a fiber optic cable retention device, wherein a door has been removed from a C-shaped body in accordance with the principles of the present disclosure.

DETAILED DESCRIPTION

Figure 11:
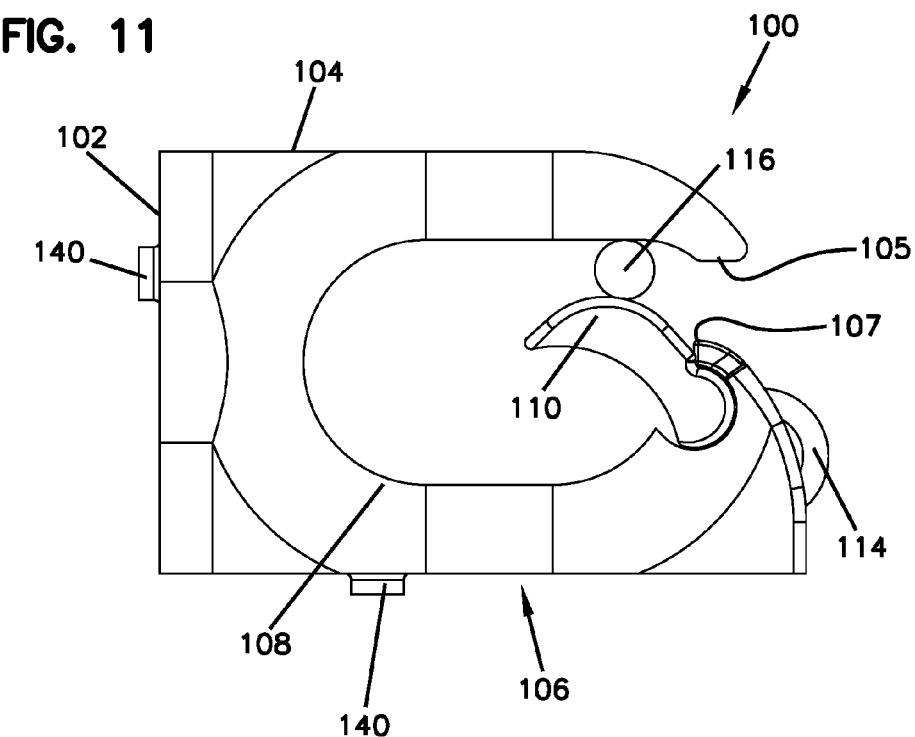
FIG. 11 is a side view of an embodiment of a fiber optic cable retention device in accordance with the principles of the present disclosure.
Figure 24:
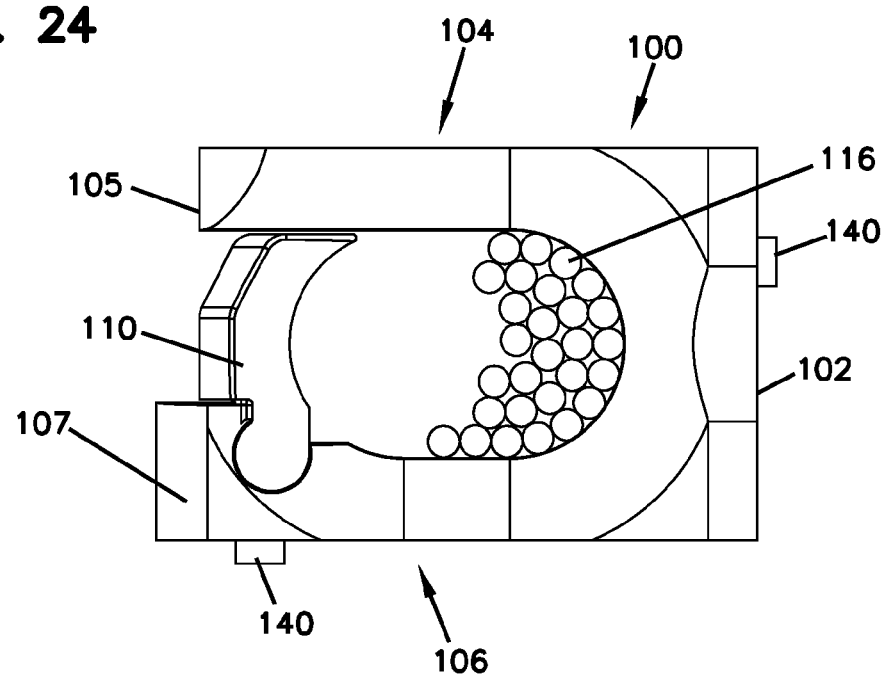
FIG. 24 is a second side view of an embodiment of a fiber optic cable retention device in accordance with the principles of the present disclosure.
Figure 25:
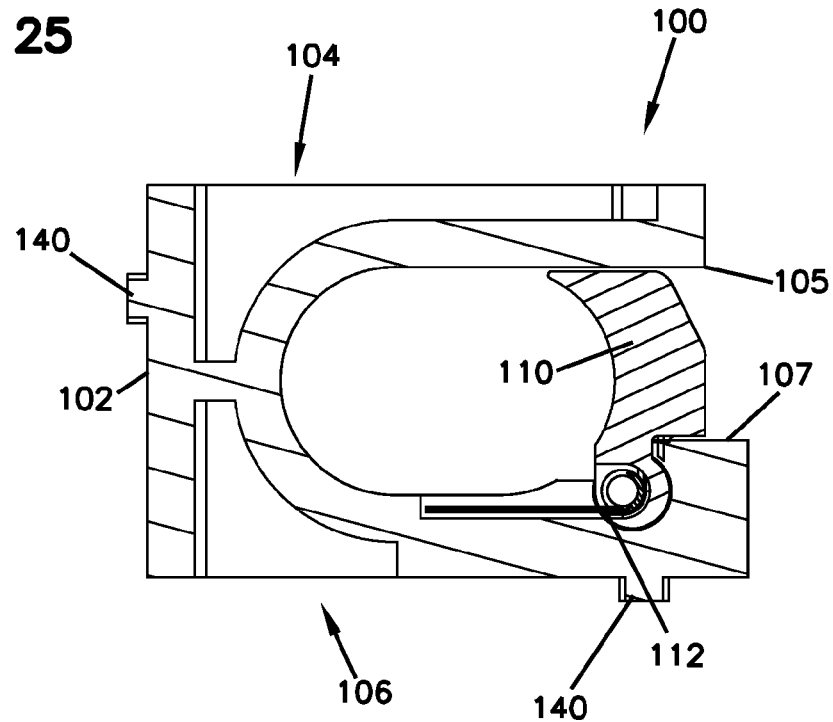
FIG. 25 is a first side, cross-sectional view of a fiber optic cable retention device in accordance with the principles of the present disclosure.
Figure 26:
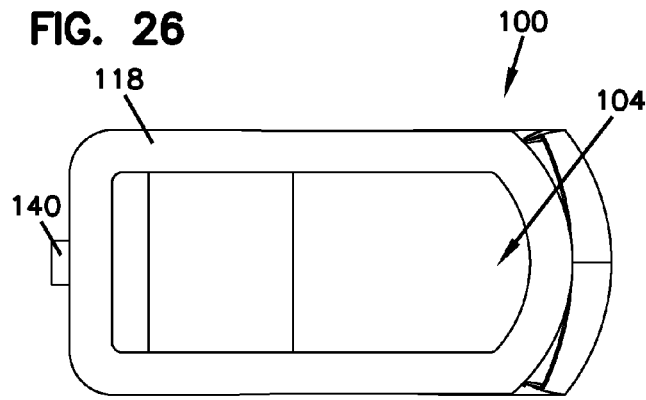
FIG. 26 is a top view of an embodiment of a fiber optic cable retention device in accordance with the principles of the present disclosure.
Figure 27:
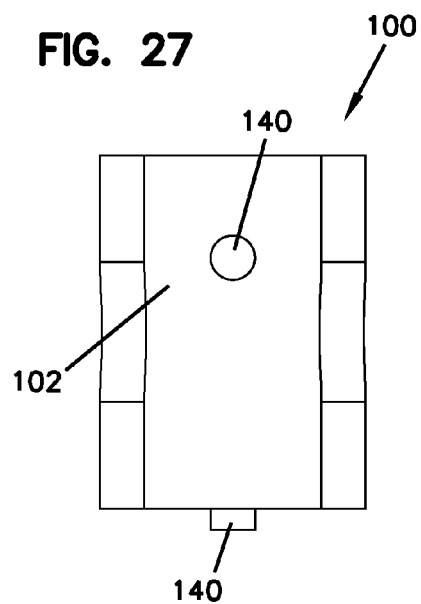
FIG. 27 is a back view of an embodiment of a fiber optic cable retention device in accordance with the principles of the present disclosure.
Figure 28:
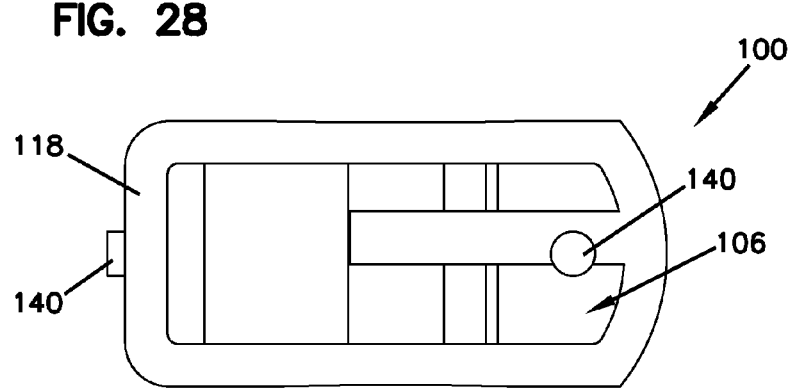
FIG. 28 is a bottom view of a fiber optic cable retention device in accordance with the principles of the present disclosure.
Figure 29:
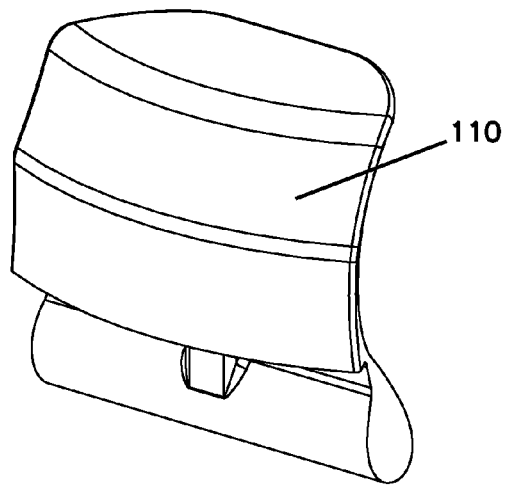
FIG. 29 is a front, isometric view of an embodiment of a door for a fiber optic cable retention device in accordance with the principles of the present disclosure.

FIGS. 1-30 illustrate various embodiments of a fiber optic cable retention device 100 in accordance with the principles of the present disclosure. The fiber optic cable retention device 100 has a C-shaped body having a flat base 102, a first end 105, a second end 107, and a rounded interior 108. The fiber optic cable retention device 100 allows for at least one fiber optic cable 116 to be inserted, stored, and removed from the rounded interior 108 of the retention device 100. For example, FIG. 11 illustrates a fiber optic cable 116 being inserted into the retention device 100 and FIG. 24 illustrates multiple fiber optic cables 116 being stored within the retention device 100. Further, the designs and/or configurations of the retention devices 100 disclosed herein allow for quick and easy insertion, storage, and removal of the fiber optic cables 116. Accordingly, the retention devices 100 described herein are easily adaptable to properly accommodate for cable management arrangements and schemes in telecommunication infrastructures that are massive in scale, have limited space, and/or require subsequent adaptation of the infrastructures.

The size and shape of the C-shaped body may be adjusted as needed for fitting into and providing the best cable management in the telecommunication infrastructures as long as the curvature of the rounded interior 108 is larger than the minimum bend radius of the fiber optic cables 116 to prevent signal degradation of stored fiber optic cables 116. For example, FIGS. 9-12 illustrate an embodiment of the retention device 100 and FIGS. 22 and 23 illustrate the same embodiment of the retention device 100 except for being configured and/or adapted to a different size and shape than the embodiment shown in FIGS. 9-12.

The flat base 102 is a planar surface that faces the exterior of the retention device 100 and is entirely flat. The flat base of the retention device 100 provides for easy installation and/or attachment within cable management arrangements and schemes in telecommunication infrastructures. The flat base 102 is configured for mounting the fiber optic cable retention device 100 to a surface, such as panel, plate, and/or cabinet. The mounting of the fiber optic cable retention device 100 allows the fiber optic cable retention device 100 hold fiber optic cables 116 in place and/or manage various cables near, next to, adjacent, or within telecommunication infrastructures. In some embodiments, the flat base further includes a pin 140 and/or a hole 142 for mounting the retention device 100 to a surface. The pin 140 and hole 142 may be utilize together or individually for mounting the retention device 100 to a surface.

The flat base 102 includes a first side 104 and second side 106. The first side 104 and second side 106 extend from the flat base 102 and also face the exterior of the retention device 100. In some embodiments, the first side 104 and/or the second side 106 are planar surfaces that are entirely flat, as illustrated in FIGS. 1-15, 20, and 21. In some embodiments, the first side 104 and/or the second side 106 include a portion 118 that is flat as illustrated in FIGS. 22-28. In further embodiments, the first side 104 and/or the second side 106 includes a pin 140 and/or a hole 142 for mounting the retention device 100 to a surface.

Figure 1:
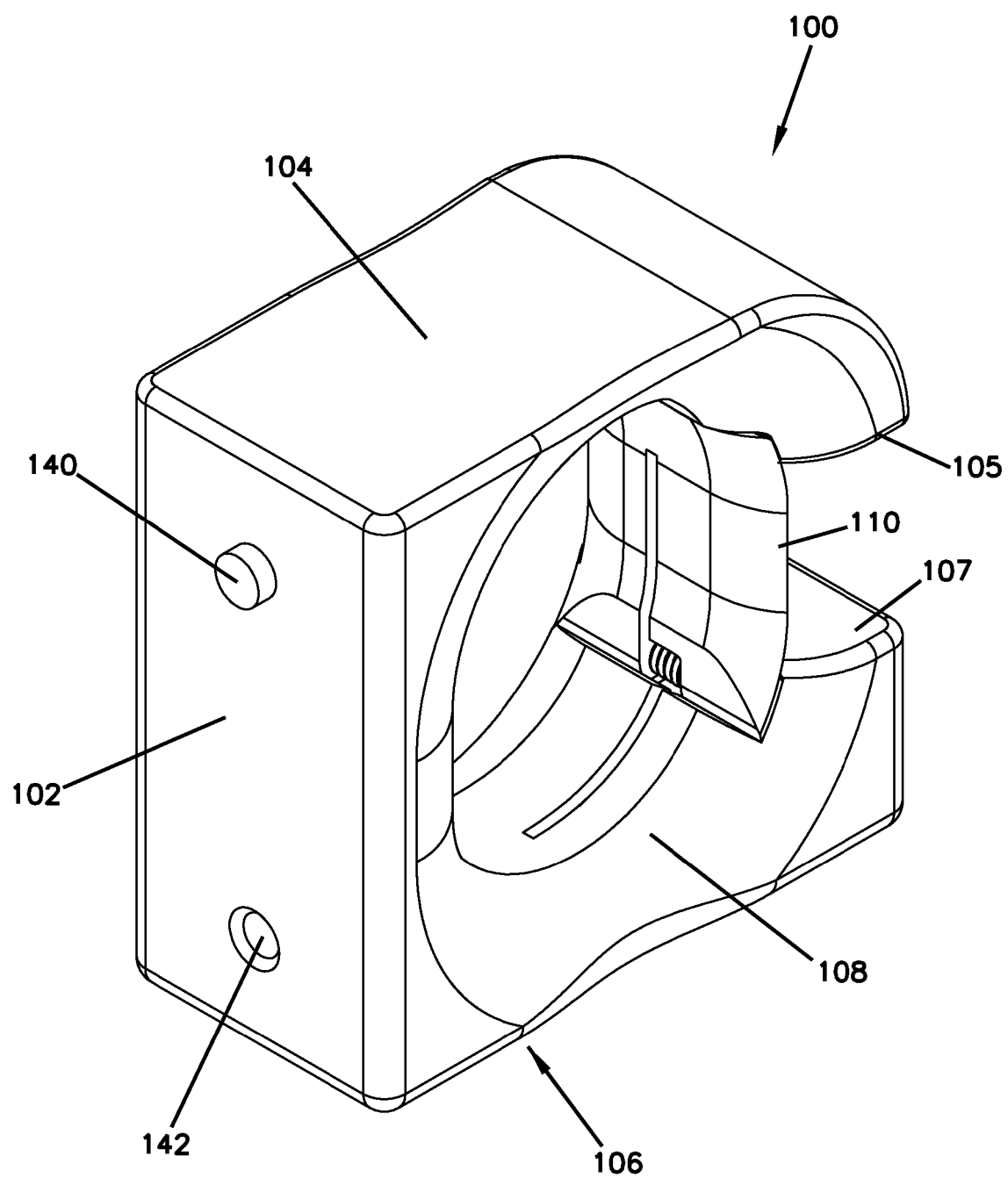
FIG. 1 is an isometric, first side view of an embodiment of a fiber optic cable retention device in accordance with the principles of the present disclosure.
Figure 4:
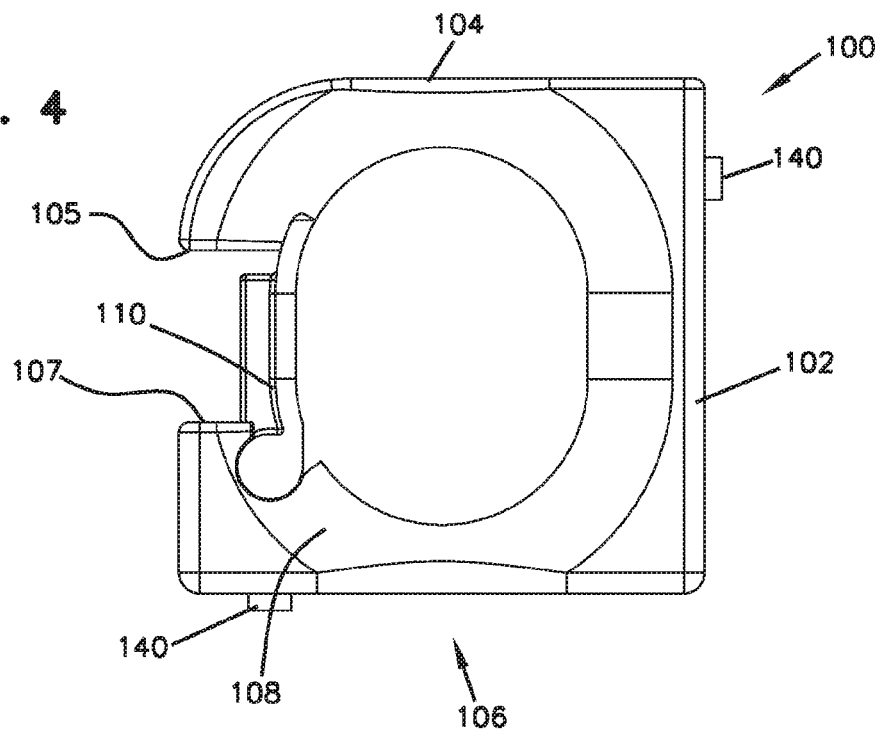
FIG. 4 is a second side view of an embodiment of a fiber optic cable retention device in accordance with the principles of the present disclosure.
Figure 5:
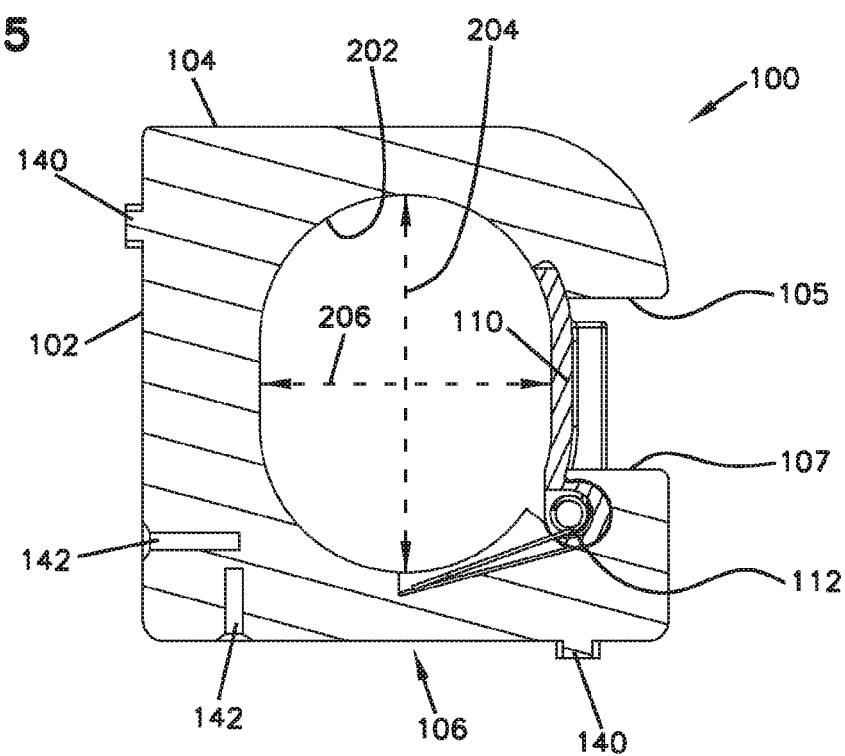
FIG. 5 is a first side, cross-sectional view of a fiber optic cable retention device in accordance with the principles of the present disclosure.
Figure 6:
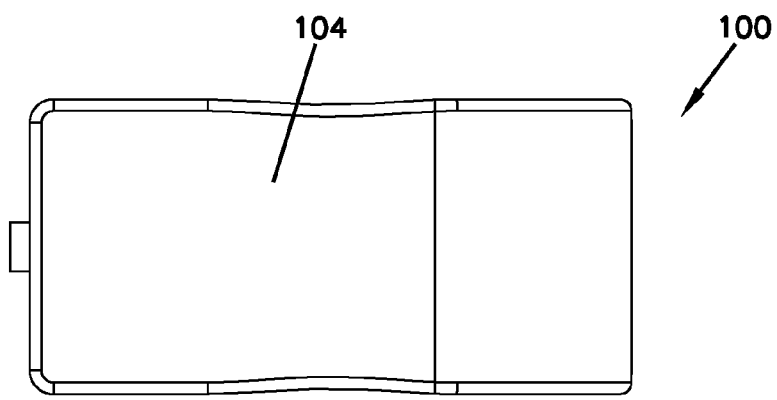
FIG. 6 is a top view of an embodiment of a fiber optic cable retention device in accordance with the principles of the present disclosure.
Figure 7:
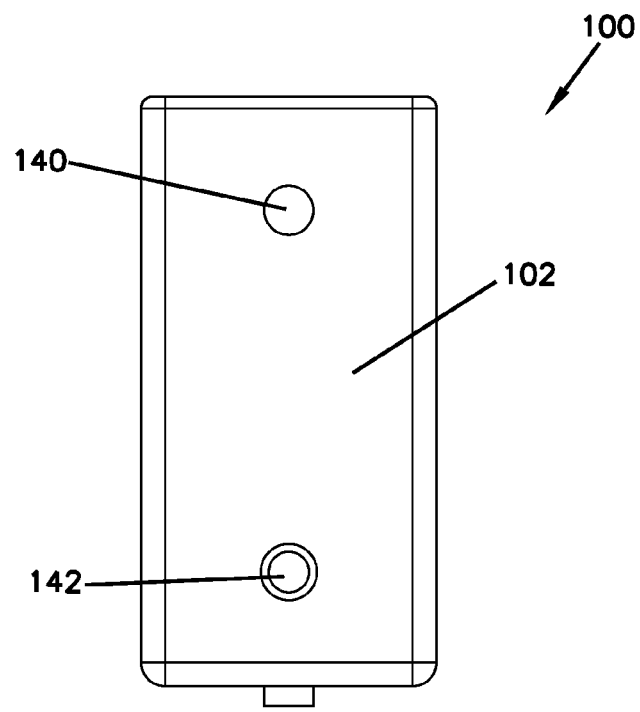
FIG. 7 is a back view of an embodiment of a fiber optic cable retention device in accordance with the principles of the present disclosure.
Figure 8:
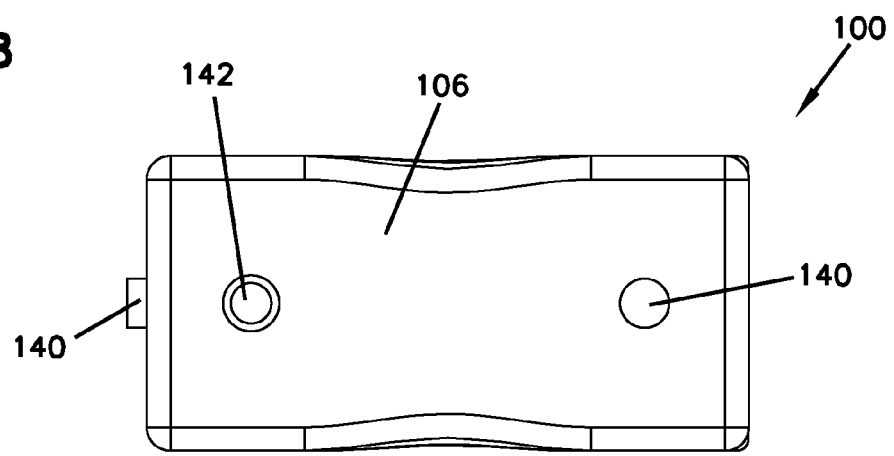
FIG. 8 is a bottom view of a fiber optic cable retention device in accordance with the principles of the present disclosure.
Figure 9:
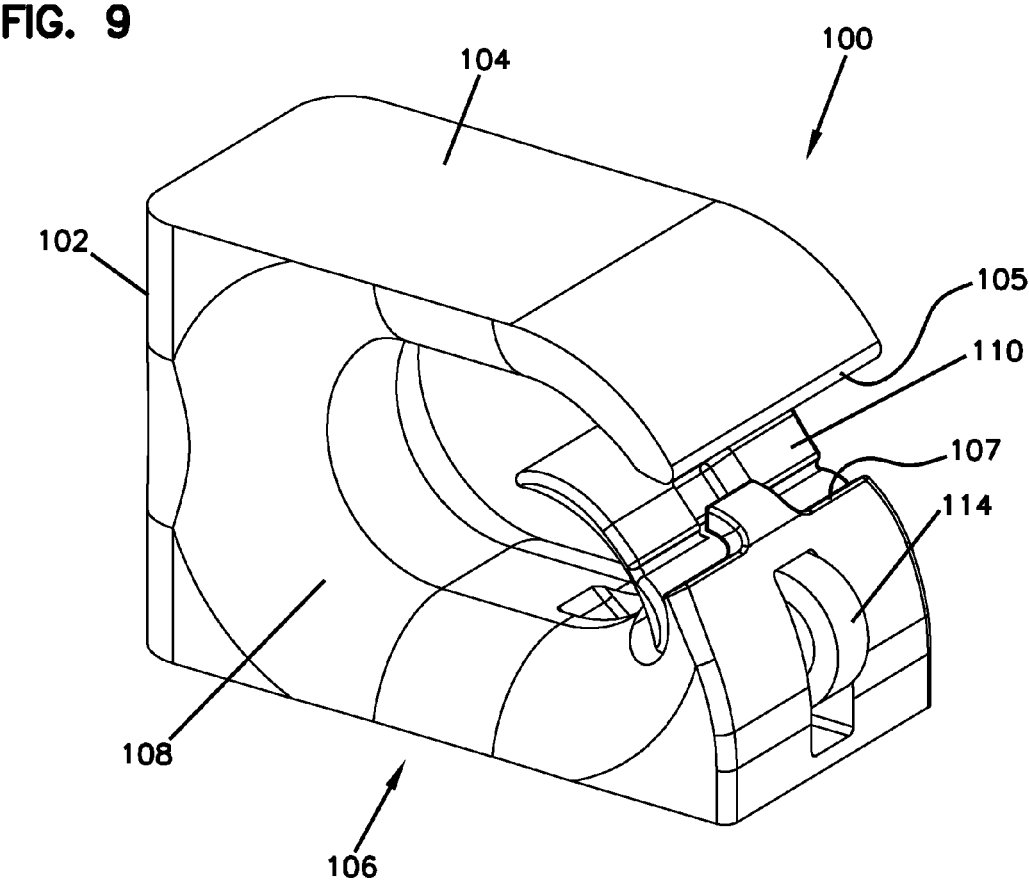
FIG. 9 is an isometric, first side view of an embodiment of a fiber optic cable retention device in accordance with the principles of the present disclosure.
Figure 10:
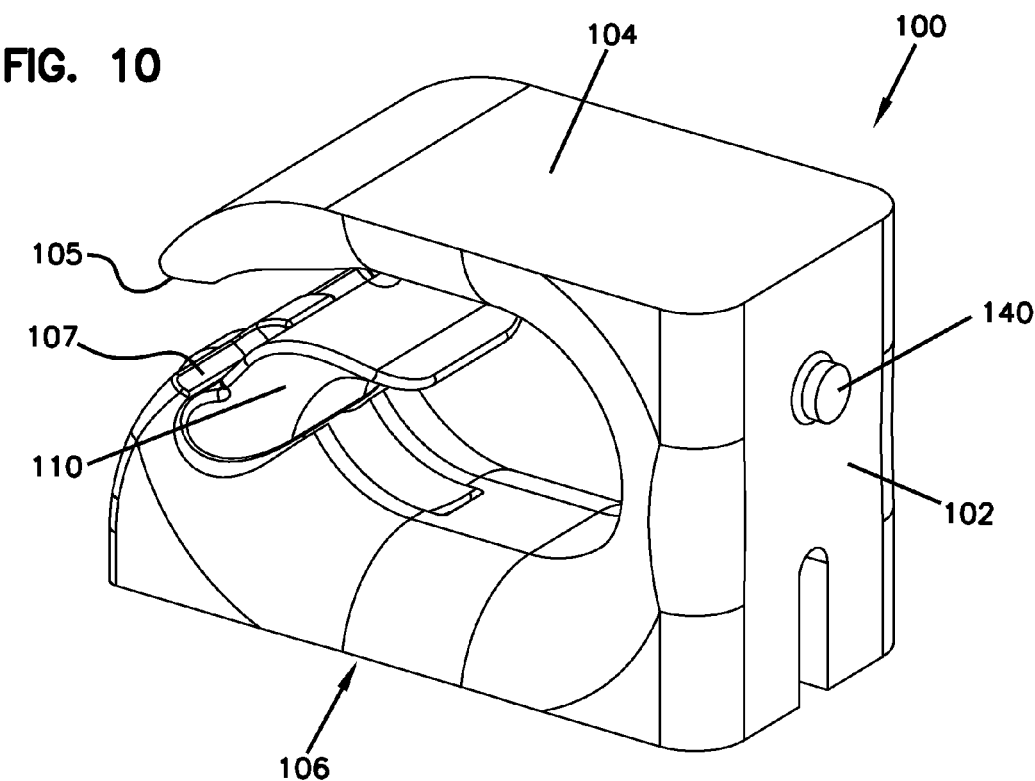
FIG. 10 is an isometric, second side view of an embodiment of a fiber optic cable retention device in accordance with the principles of the present disclosure.

In some embodiments, the flat base 102 includes a third side. In some embodiments, the flat base 102 includes a fourth side. In other embodiments, the flat base 102 includes a third side and a fourth side. The third side extends from the first side and the fourth side extends from the second side. In some embodiments, the third side and/or the fourth side is a planar surface and entirely flat. In some embodiments, the third side and/or the fourth side include a portion that is flat. In other embodiments, the third and/or fourth side does not include a flat portion. For example, FIGS. 4 and 5 illustrate a third side that does not include a flat portion, since it is rounded and a fourth side that is entirely flat. As illustrated in the embodiments shown in FIGS. 9 and 10, both the third and fourth sides are rounded and do not include a flat portion.

The rounded interior 108 faces the interior of the retention device 100 and extends from the flat base 102 including at least the first side 104 and second side 106. In some embodiments, the rounded interior 108 further extends from any third and/or fourth side if present in the retention device 100. The curvature of the rounded interior 108 is larger than the minimum bend radius of the fiber optic cables 116 to prevent signal degradation of stored fiber optic cables 116. Further, the curvature of the rounded interior 108 forms the C-shape of the body of the retention device 100.

The first end 105 and the second end 107 of the C-shaped body form an opening to the rounded interior 108 of the C-shaped body. The opening is sized and/or configured to allow at least one fiber optic cable 116 to pass through the opening at a time. However, a door 110 attached to the C-shaped body is configured and/or sized so that the door 110 in a closed position at least substantially covers the opening. The opening is substantially closed off or covered if a single fiber optic cable 116 could not pass through the space provided between one end (105 or 107) of the C-shaped body and the door 110. In the closed position, fiber optic cables 116 cannot be added to or removed from the interior of the retention device 100. For instance, FIGS. 1, 2, 4, 5, 12, 24, and 25 illustrate a retention device 100 with a door 110 in a closed position. The door 110 is moveable into an open position. The door 110 is in an open position when the space between the door 110 and one end (105 or 107) of the C-shaped body is at least wide enough for a single fiber optic cable 116 to pass through the opening between the door 110 and one end (105 or 107) of the C-shaped body. In some embodiments, the open position may allow for multiple fiber optic cables 116 to pass through the opening at one time between the door 110 and one end (105 or 107) of the C-shaped body. In the open position, fiber optic cables 116 may be added to or removed from the interior of the retention device 100. For instance, FIGS. 3, 9, 10, 11, 20, 21, 22, and 23 illustrate a retention device 100 with a door 110 in an open position.

The door 110 may be moveably attached to the C-shaped body by a number of various mechanisms. In some embodiments, the door 110 is nested in the C-shaped body as illustrated in FIGS. 1-5, 9-12, and 20-25. The C-shaped body may have a receiving area that is configured to receive the door 110 and to allow the door 110 to move, pivot, and/or rotate within the receiving area of the C-shaped body.

In some embodiments, the door 110 is biased into the closed position with a spring 112 as illustrated in FIGS. 1-5, and 24-25. The spring 112 is nested and/or contained within the C-shaped body and is operatively connected to the door 110. The spring 112 is a separate individual component from the door 110 and the C-shaped body. In some embodiments, the spring 112 is located within the receiving area of the C-shaped body. In some embodiments, the spring 112 directly contacts the door 110. When the door 110 is attached to the interior of the C-shaped body, the spring 112 biases the door 110 towards the exterior of the C-shaped body. When the door 110 is attached to the exterior of the C-shaped body, the spring 112 biases the door 110 towards the interior of the C-shaped body. The door 110 may be moved, pivoted, and/or rotated to the door open position by applying a force to the door 110 opposite to the biasing direction. The force may be the manual application of force by an operator, installer, or user of the telecommunication infrastructures. For example, the door 110 may be opened via a force from at least one fiber optic cable 116 pushing up against the door 110. Once the cable 116 has reached the interior of the C-shaped body and/or passes over the door 110, the spring 112 biases the door back into the closed position. Accordingly, the biased door 110 provide for a fast, easy, and/or efficient process for storing and/or managing cables in a telecommunication infrastructure.

For example, as illustrated in FIGS. 2 and 5 a coil spring 112 is utilized by the retention device 100. The coil spring 112 has a coil portion, a door end, and a body end. In some embodiments, the door end and the coil portion of the coil spring 112 are nested or extend within the door 110 and the body end is nested or extends within the C-shaped body. In these embodiments, the door 110 may include a slot for the door end of the spring and/or a spring recess area for holding the coil portion of the spring 112, as illustrated in FIG. 5. In some embodiments, the body end of the coil spring is located in the receiving area of the C-shaped body. Further, a portion of the door 110 and the coil portion of the spring 112 may further be located in the receiving area of the C-shaped body as illustrated in FIG. 5.

Figure 12:
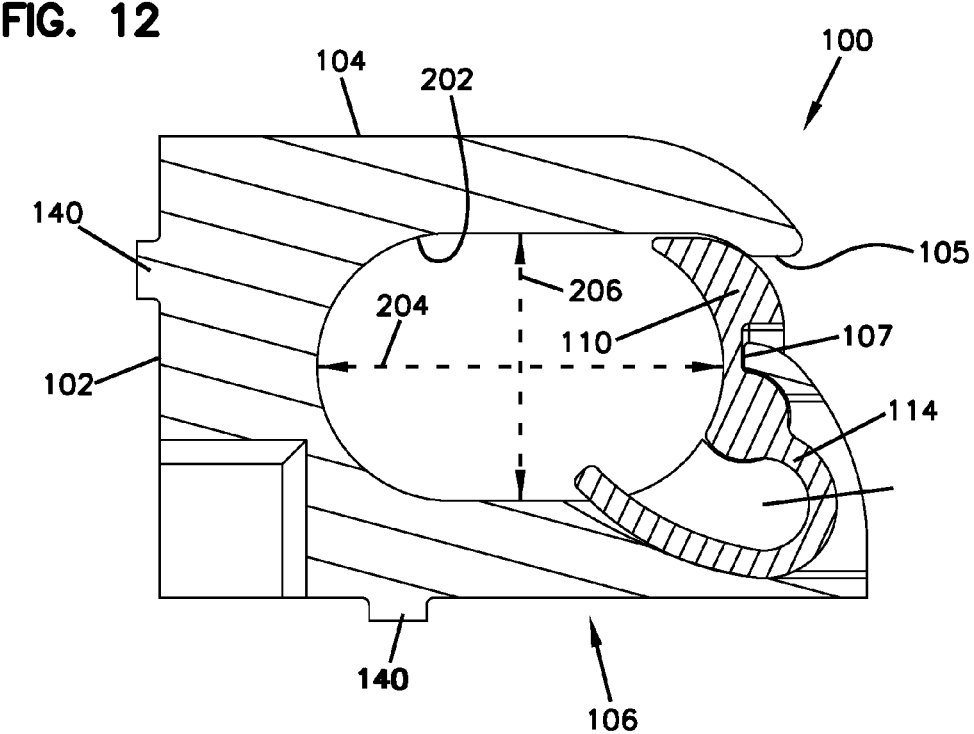
FIG. 12 is a first side, cross-sectional view of a fiber optic cable retention device in accordance with the principles of the present disclosure.
Figure 13:
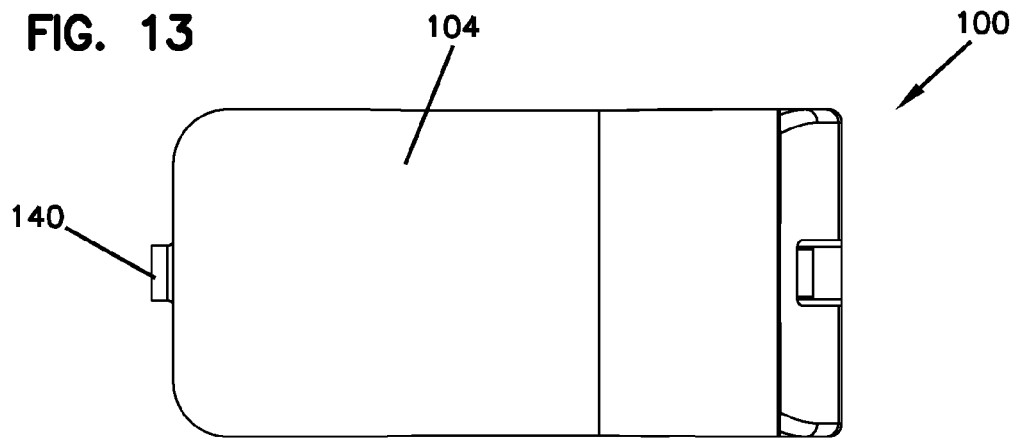
FIG. 13 is a top view of an embodiment of a fiber optic cable retention device in accordance with the principles of the present disclosure.
Figure 14:
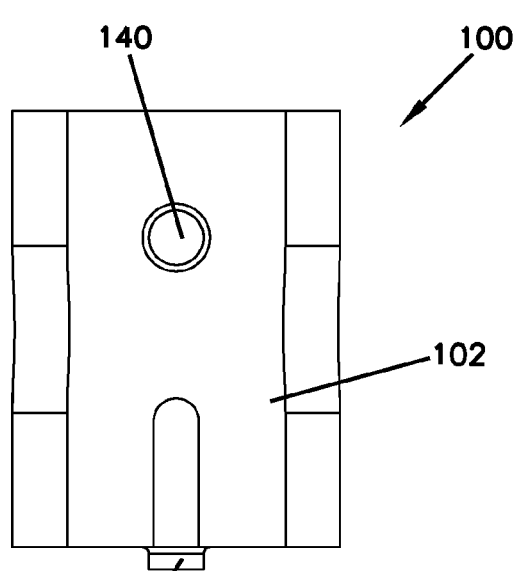
FIG. 14 is a back view of an embodiment of a fiber optic cable retention device in accordance with the principles of the present disclosure.
Figure 15:
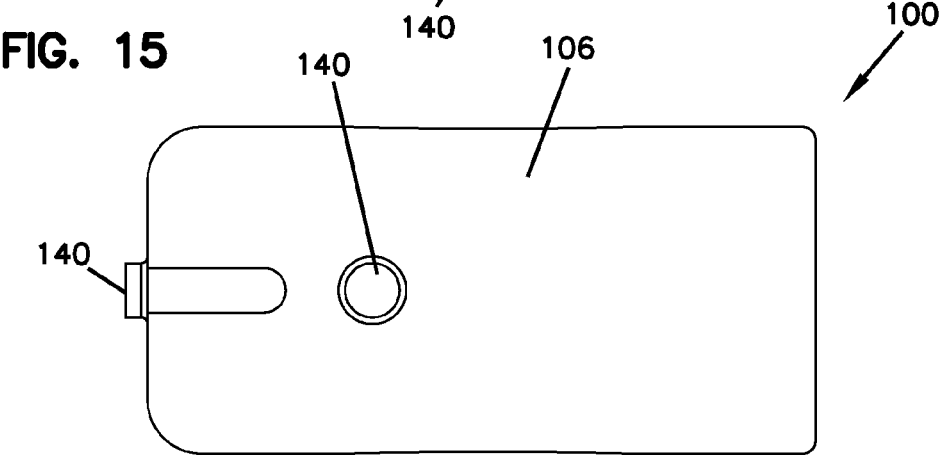
FIG. 15 is a bottom view of a fiber optic cable retention device in accordance with the principles of the present disclosure.
Figure 16:
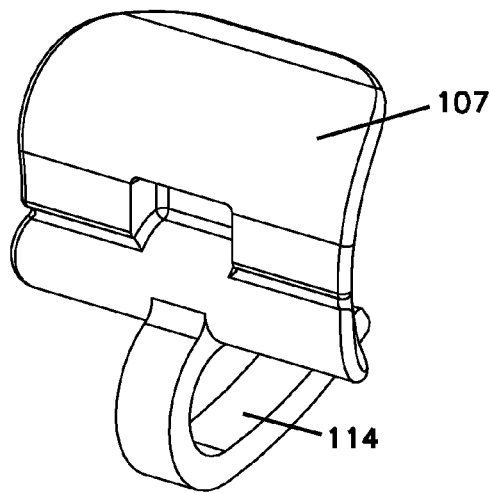
FIG. 16 is a front, isometric view of an embodiment of a door for a fiber optic cable retention device in accordance with the principles of the present disclosure.
Figure 17:
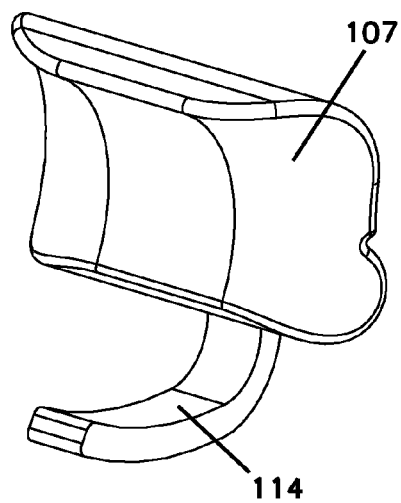
FIG. 17 is a back, isometric view of an embodiment of a door for a fiber optic cable retention device in accordance with the principles of the present disclosure.
Figure 18:
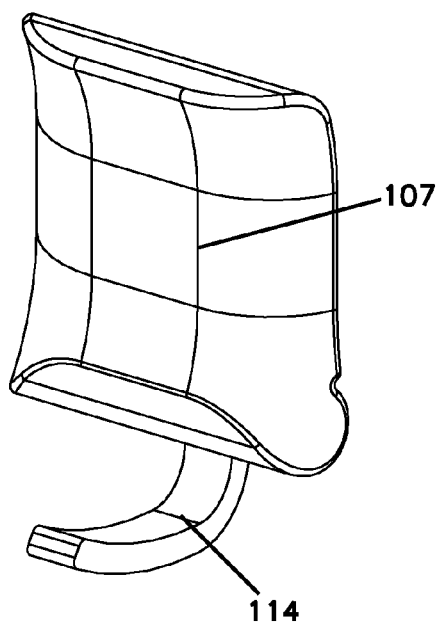
FIG. 18 is a back, isometric view of an embodiment of a door for a fiber optic cable retention device in accordance with the principles of the present disclosure.
Figure 19:
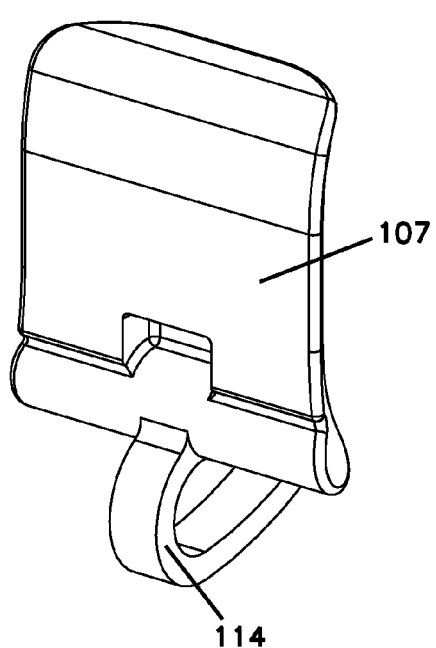
FIG. 19 is a front, isometric view of an embodiment of a door for a fiber optic cable retention device in accordance with the principles of the present disclosure.
Figure 20:
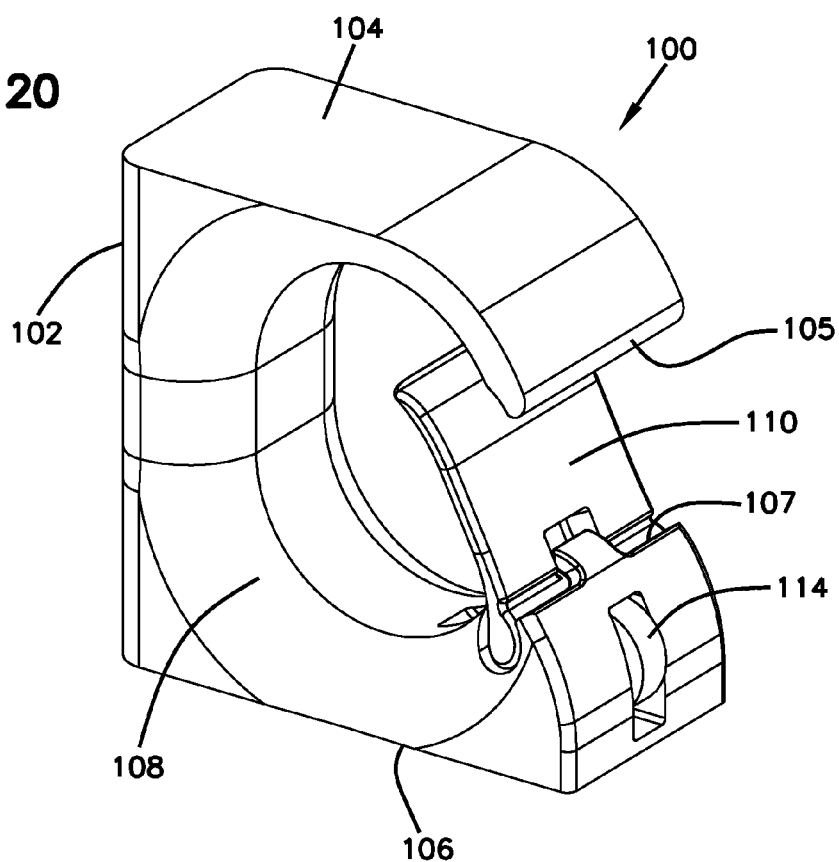
FIG. 20 is an isometric, first side view of an embodiment of a fiber optic cable retention device in accordance with the principles of the present disclosure.
Figure 21:
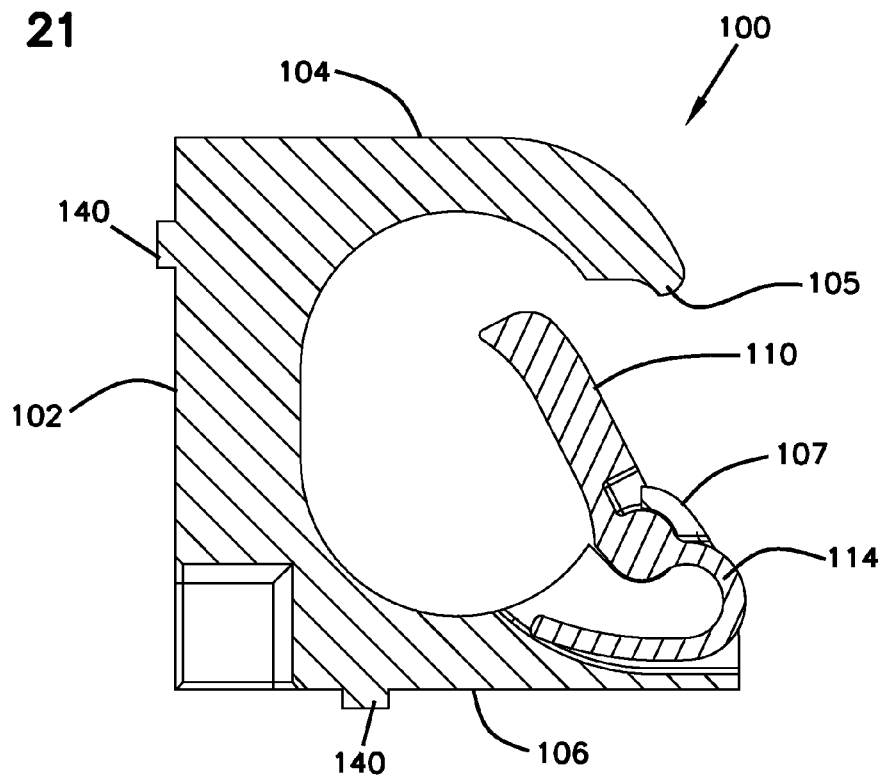
FIG. 21 is a first side, cross-sectional view of a fiber optic cable retention device in accordance with the principles of the present disclosure.

In other embodiments, the door 110 includes a biasing member 114 for biasing the door 110 into a closed position as illustrated in FIGS. 9-12, 20-23, and 30. The biasing member 114 is a flexible member that extends from one end of the door 110. The biasing member 114 is integral to the door 110. In some embodiments, the biasing member 114 is curved as illustrated in FIGS. 12 and 16-21. In other embodiments, the biasing member is straight as illustrated in FIG. 30. In some embodiments, a portion of the door is located within the receiving area of the C-shaped body. In some embodiments, the portion of the door located within the receiving area of the C-shaped body includes the biasing member 114. For example, as illustrated in FIGS. 12, 21, and 30 the receiving area is configured to conform to the shape of the biasing member 114 allowing the biasing member to nest, be received, and/or snap-fit into the receiving area of the C-shaped body. In some embodiments, the receiving area may further include a slot that allows the biasing member 114 while being biased, which causes the biasing member to bend, to extend through the slot as illustrated in FIGS. 11 and 20. Accordingly, a portion of the door 110 including the biasing member 114 is nested and/or contained within the C-shaped body.

When the door 110 is attached to the interior of the C-shaped body, the biasing member 114 biases the door 110 towards the exterior of the C-shaped body. When the door 110 is attached to the exterior of the C-shaped body, the biasing member 114 biases the door 110 towards the interior of the C-shaped body. The door 110 may be moved, pivoted, and/or rotated to the door open position by applying a force to the door 110 opposite to the biasing direction. The force may be the manual application of force by an operator, installer, or user of the telecommunication infrastructures. For example, the door 110 may be opened via a force from at least one fiber optic cable 116 pushing up against the door 110. Once the cable 116 has reached the interior of the C-shaped body and/or passes over the door 110, the biasing member 114 biases the door back into the closed position. Accordingly, the biased door 110 provides for a fast, easy, and/or efficient process for storing and/or managing cables in a telecommunication infrastructure.

FIGS. 5 and 12 illustrate the retention device 100 as having a through-passage 202. As shown in FIGS. 5 and 12, the through-passage 202 has a major dimension 204 and a minor dimension 206. The major dimension 204 is larger than the minor dimension 206.

As discussed above, all of the designs and/or configurations of the retention devices 100 disclosed herein allow for quick and easy insertion, storage, and removal of the fiber optic cables 116 from the interior of the retention device 100. Accordingly, the retention devices 100 described herein are easily adaptable to properly accommodate for cable management arrangements and schemes in telecommunication infrastructures that are massive in scale, have limited space, and/or require subsequent adaptation of the infrastructures.

The cables may be removed by manually pushing inward on the door against the spring biasing force, and removing the cable or cables by hand.

Numerous other changes may be made which will readily suggest themselves to those skilled in the art and which are encompassed in the spirit of the disclosure and/or as defined in the claims. While various embodiments have been described for purposes of this disclosure, various changes and modifications may be made which are well within the scope of the present disclosure.

What is claimed is:

1. A cable retention device comprising:
    a body defining a through-passage extending along a first axis from a first end of the body to a second end of the body, the body having an inner surface bounding the through-passage, the inner surface having a curvature along the first axis that is larger than a minimum bend radius of any optical fiber extending along the through-passage, the body also defining a slot parallel to the first axis that provides access to the through-passage from an exterior of the body; and
    a door moveably coupled to the body, the door being configured to move between a closed position and an open position, the door extending across the slot to close the through-passage when disposed in the closed position, the door extending into the through-passage when disposed in the open position, the door being biased to the closed position;
    wherein the body defines a first mounting surface at an opposite side of the body from the slot, and the first mounting surface includes a flat exterior surface outside of the through-passage; and
    at least one peg protrudes from the first mounting surface in a direction outside of the through-passage.

2. The cable retention device of claim 1, wherein the door has a concave surface the faces the through-passage and a convex surface that faces away from the through-passage.

3. The cable retention device of claim 1, wherein the body defines a C-shape.

4. The cable retention device of claim 1, wherein the body includes a second mounting surface that extends between the first mounting surface and a side of the body at which the slot is defined.

5. The cable retention device of claim 4, wherein the second mounting surface includes a flat exterior surface from which at least one peg protrudes.

6. The cable retention device of claim 1, wherein the through-passage has an oblong profile when the door is disposed in the closed position.

7. The cable retention device of claim 1, wherein the through-passage has a major dimension and a minor dimension that are transverse to the first axis, the major dimension being larger than the minor dimension.

8. The cable retention device of claim 7, wherein the door extends a majority of the major dimension.

9. The cable retention device of claim 7, wherein the door extends a majority of the minor dimension.

10. The cable retention device of claim 1, wherein the slot is narrower than the through-passage.

11. The cable retention device of claim 1, wherein the door is nested within the body.

12. The cable retention device of claim 1, wherein the body inhibits movement of the door outwardly from the slot.

13. The cable retention device of claim 1, wherein the door is biased by a torsion spring.

14. The cable retention device of claim 13, wherein the torsion spring is contained within the body.

15. The cable retention device of claim 1, wherein the door is biased by a leaf spring.

16. The cable retention device of claim 15, wherein a portion of the leaf spring extends outwardly from the body.

17. The cable retention device of claim 1, wherein the door pivots between the open and closed positions.

* * * * *

UNITED STATES PATENT AND TRADEMARK OFFICE
CERTIFICATE OF CORRECTION

PATENT NO. : 9,500,829 B2  
APPLICATION NO. : 14/341971  
DATED : November 22, 2016  
INVENTOR(S) : Rudenick et al.

Page 1 of 1

It is certified that error appears in the above-identified patent and that said Letters Patent is hereby corrected as shown below:

In the Claims

Column 8, Line 12, Claim 2: "surface the faces the through-passage" should read --surface that faces the through-passage--

Signed and Sealed this  
Fifth Day of December, 2017

Joseph Matal  
*Performing the Functions and Duties of the*  
*Under Secretary of Commerce for Intellectual Property and*  
*Director of the United States Patent and Trademark Office*